April 24, 1962  G. C. SHINN  3,031,206
RECESSIBLE FIFTH WHEEL PIN
Filed Dec. 16, 1959  2 Sheets-Sheet 1
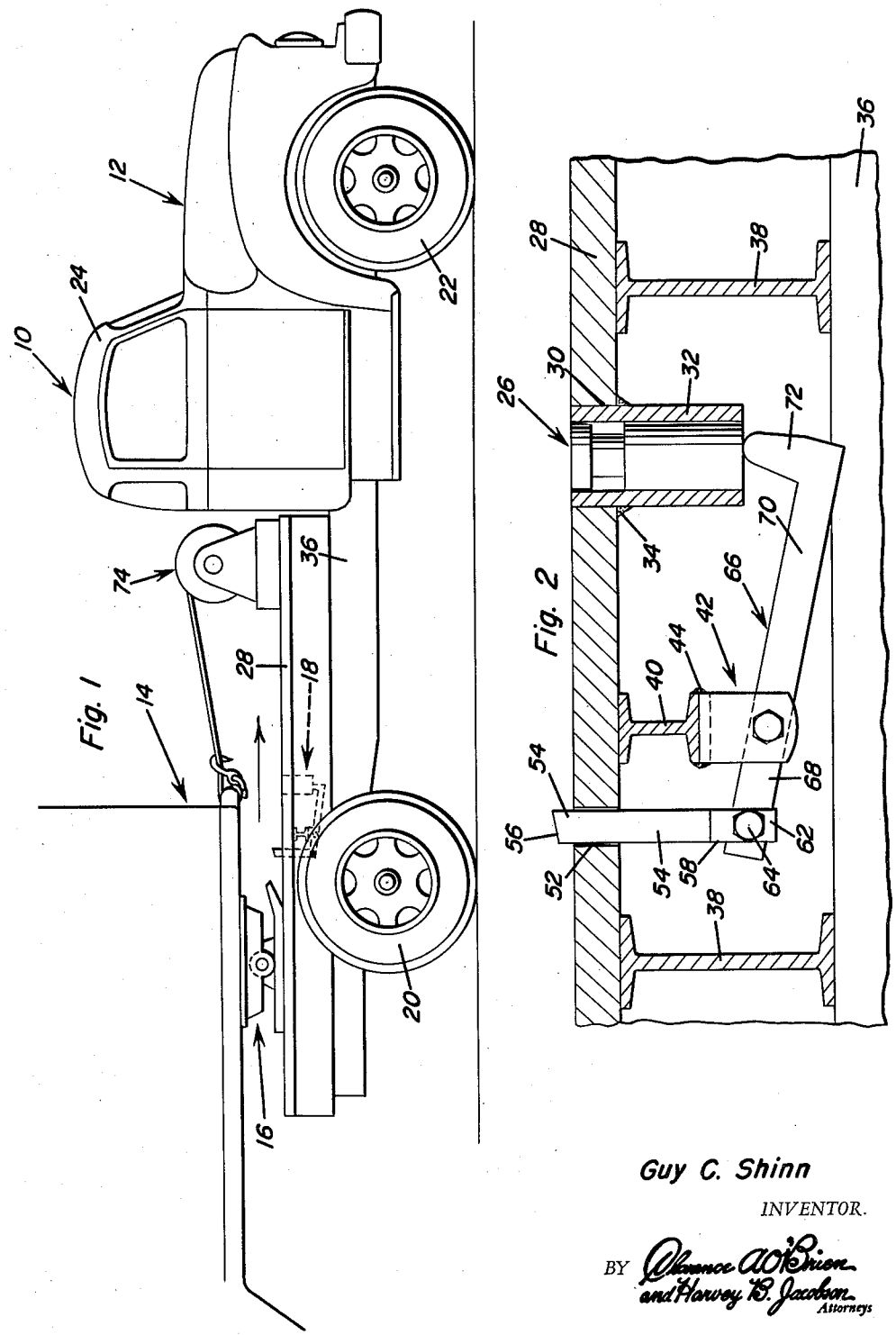
Guy C. Shinn
INVENTOR.

April 24, 1962 G. C. SHINN 3,031,206
RECESSIBLE FIFTH WHEEL PIN
Filed Dec. 16, 1959 2 Sheets-Sheet 2
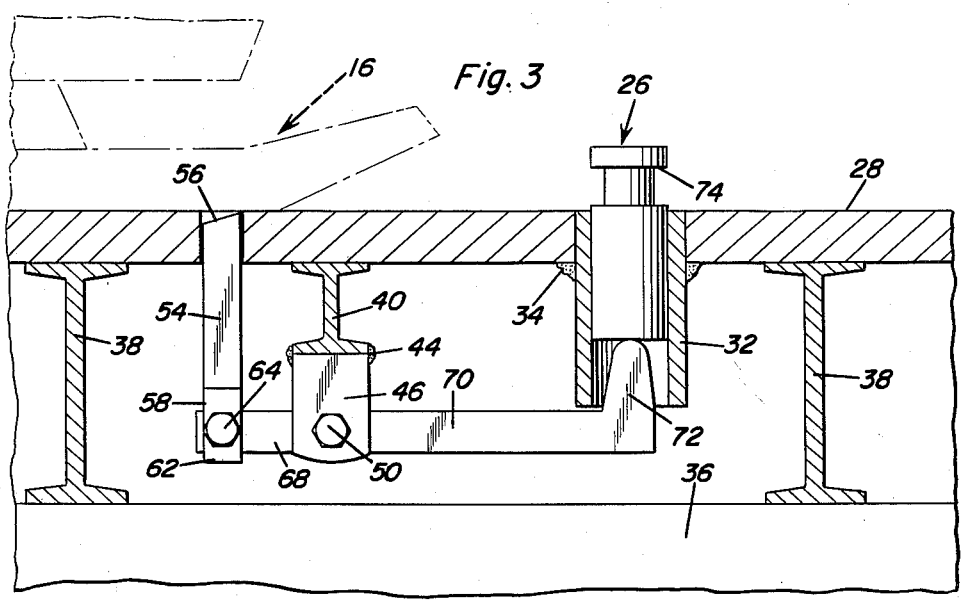
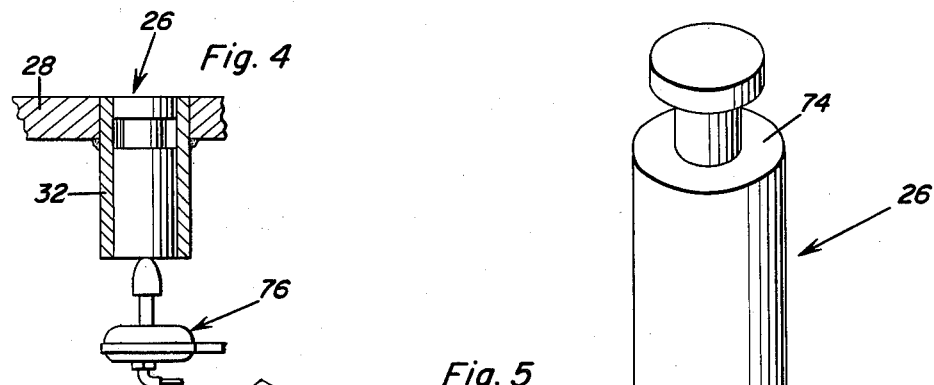
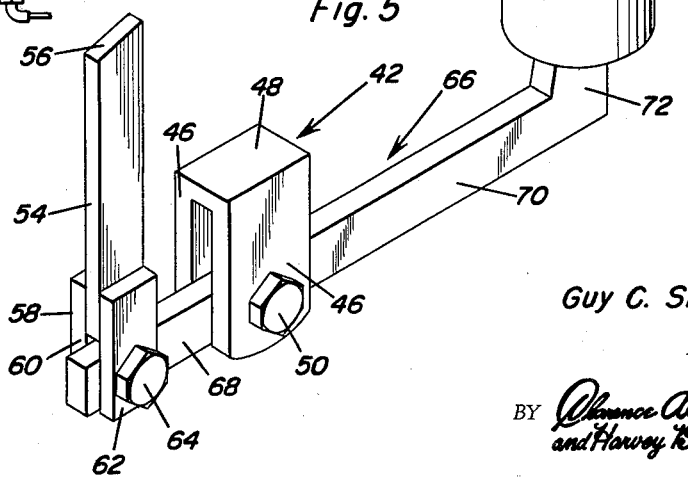
Guy C. Shinn
INVENTOR.

United States Patent Office 3,031,206
Patented Apr. 24, 1962

3,031,206
RECESSIBLE FIFTH WHEEL PIN
Guy C. Shinn, P.O. Box 308, Hamilton, Tex.
Filed Dec. 16, 1959, Ser. No. 860,034
5 Claims. (Cl. 280—433)

This invention relates to a recessible fifth wheel pin, and more particularly to a fifth wheel pin that is adapted for engagement with a fifth wheel connector plate and is adapted to be mounted to the bed of a tractor in a manner whereby the pin may be recessed below the upper surface of the tractor bed when its use is not required so that the bed of the tractor may be used for carrying loads.

In a tractor-trailer combination vehicle, the tractor is used to support the forward end of the trailer which is pivotally secured to the rear end of the tractor by means of a fifth wheel assembly. The fifth wheel assembly usually comprises a fifth wheel connector plate carried by either the tractor vehicle or the trailer vehicle which is engageable with a fifth wheel pin assembly carried by the other vehicle. In tractor-trailer combination vehicles the tractor heretofore has not been provided with a load bed adapted to carry loads when a trailer is not connected to the tractor inasmuch as it was most desirable to have a tractor vehicle of very short wheel base to enable a tractor-trailer combination vehicle to have great maneuverability. However, with the increased number of super highways over which tractor-trailer combination vehicles travel, the manueverability of such a combination vehicle has less significance since such a vehicle is not subjected to situations wherein it must be highly maneuverable when travelling over super highways. As the tractor vehicle of a tractor-trailer combination vehicle is used mostly to haul the loaded trailer from one destination to another and then is returned to the first destination without the trailer connected thereto, the return trip of the tractor by itself has presented a loss in both time and money inasmuch as both the tractor and the driver are required to return the tractor to the original destination. The time spent by the driver in returning the tractor to the original destination and the wear and tear of the tractor vehicle itself plus the length of time it is restricted from carrying a pay load result in a non-profit situation which could be changed to a profit making situation if the bed of the tractor vehicle were suitable for carrying pay loads.

It is therefore the primary object of this invention to provide a fifth wheel assembly for a tractor-trailer combination vehicle wherein the fifth wheel connector plate is carried by the trailer vehicle and the fifth wheel pin assembly is carried by the bed of the tractor vehicle, the fifth wheel pin assembly being recessible to a position below the upper surface of the tractor bed wherein the latter may be then used to carry a pay load in the return trip to point of origin.

A further object of this invention, in accordance with the preceding object, is to provide a means wherein the fifth wheel pin assembly carried by the tractor vehicle may be moved automatically into an operational position extending above the upper surface of the tractor bed upon the movement of the fifth wheel connector plate assembly which is secured to the tractor vehicle over the bed of the tractor toward the fifth wheel pin.

An ancillary object of this invention is to provide a means whereby the recessible fifth wheel pin assembly may be actuated into an operational position by means of an actuating mechanism operable from a remote position such as the cab of the tractor vehicle.

A final object to be specifically enumerated herein is to provide a recessible fifth wheel pin on the tractor of a tractor-trailer combination vehicle which will conform to conventional forms of manufacture, be of simple construction and easy to operate so as to provide a device that will conform to conventional forms of manufacture, be durable and operable by substantially every tractor-trailer combination vehicle operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the recessible fifth wheel pin shown mounted in the bed of a tractor vehicle, the trailer vehicle having a fifth wheel assembly thereon being shown in position for engagement with the recessed fifth wheel pin;

FIGURE 2 is an enlarged longitudinal vertical sectional view taken substantially upon a plane passing through the center line of the tractor vehicle showing the recessible fifth wheel pin in a recessed inoperational position;

FIGURE 3 is a longitudinal vertical sectional view similar to that of FIGURE 2 but showing the recessible fifth wheel pin in an extended operational position, the fifth wheel connector plate of a trailer vehicle being shown in dotted lines for engagement with the actuating mechanism for the recessible fifth wheel pin;

FIGURE 4 is a fragmentary longitudinal vertical sectional view of a modified form of recessible fifth wheel pin wherein a fluid actuator is utilized to move the recessed pin to an extended operational position for engagement with a fifth wheel connector plate; and FIGURE 5 is an enlarged perspective view of the recessible fifth wheel pin assembly.

Referring now more specifically to the drawings, the numeral 10 generally designates a form of tractor-trailer combination vehicle which includes a tractor generally designated by the reference numeral 12 and a trailer, generally designated by the reference numeral 14. The trailer 14 has secured to the forward portions thereof a conventional form of fifth wheel connector plate generally desginated by the reference numeral 16 which is inverted so as to be engageable with the fifth wheel pin assembly which is carried by the tractor 12 and is generally designated by the reference numeral 18.

The tractor 12 includes the usual rear supporting wheels 20 and front supporting wheels 22 with a cab 24 being provided for the driver of the vehicle 12.

It is to be understood that the fifth wheel connector plate assembly 16 is of conventional design as is the pin 26 of the fifth wheel pin assembly 18 and therefore it is deemed unnecessary to elaborate further on the specific structure of the fifth wheel connector plate 16. However, inasmuch as the fifth wheel pin 26 is not fixedly secured to the bed 28 of the tractor 12 and is the subject of the instant invention, the specific structure of and the operation of the fifth wheel connector assembly 18 is hereinafter set forth.

The bed 28 of the tractor 12 is provided with an opening 30 through which there is secured a cylindrical sleeve 32 by any convenient means such as welding 34. It will be noted that the welding 34 is formed between the undersurface of the bed 28 and the adjacent surfaces of the sleeve 32 and also that the upper edges of the sleeve 32 are coplanar with the upper surface of the bed 28. The bed 28 of the tractor 12 is supported above the frame 36 thereof by means of transverse beams 38. A support beam 40 is secured to the undersurface of the bed 28 and has secured thereto a depending inverted U-shaped support member generally designated by the reference numeral 42 which is secured to the beam 40 by any convenient means such as welding 44. The support member 42, see in particular FIGURE 5, comprises a pair of depending legs 46 interconnected at their upper ends by means of a bight portion 48. The lower ends of the legs 46 are provided with aligned apertures (not shown) which receive therethrough a pivot fastener 50.

The bed 28 is also provided with a slot 52 which slidably receives an actuating link 54 whose upper end is beveled as at 56 and whose lower end is bifurcated as at 58 having furcations 60 and 62. The furcations 60 and 62 are suitably apertured and have a pivot pin 64 secured therethrough.

An actuating lever generally designated by the reference numeral 66 extends beneath the bed 28 between the slot 52 and the opening 30 and has its rear end received and pivotally secured between the furcations 60 and 62 of the actuating link 54 by means of the pivot pin 64 which extends through an aperture (not shown) formed in that end of the actuating lever 66 which comprises a lever arm 68. The intermediate portion of the actuating lever 66 is also provided with a suitable aperture (not shown) which receives therethrough the pivot fastener 50. The end of the actuating lever 66 remote from the lever arm 68 comprises a work arm 70 having an upstanding projection 72 formed on its end remote from the lever arm 68. The projection 72, see in particular FIGURE 3, is adapted to be received within the lower end of the sleeve 32 whereby it may, upon downward movement of the actuating link 54, urge the fifth wheel pin 26 into an upwardly extending operational position whereby it may be engaged by the fifth wheel connector plate 16. It is to be noted that the sleeve 32 could be provided with a lower counterbore and that the pin 26 could be provided with a radially extending shoulder portion on its lower end slidably disposed in such a counterbore whereby the upward movement of the pin 26 will be limited to that which is just sufficient to position the circumferential notch 74 formed therein above the upper surface of the bed 28 so that the fifth wheel connector plate 16 may be engaged therewith and the pin 26 may not be withdrawn from the sleeve 32. Additionally, suitable means may also be provided for limiting the downward movement of the work arm 70 whereby the downward movement of the pin 26 is also limited.

In operation, the trailer 14 is moved forwardly along the upper surface of the bed 28 by means of a suitable winch generally designated by the reference numeral 74 or other convenient means to slide the fifth wheel connector into engagement with the beveled surface 56 of the actuating link 54. Upon the engagement of the connector plate 16 with the actuating link 54, downward movement of the latter will be effected whereby the actuating lever 66 will be oscillated in a counterclockwise direction as seen in FIGURES 2 and 3 to engage the projection 72 with the lower surface of the pin 26 whereby the latter will be moved to an extended position with the notch 74 therein disposed above the upper surface of the bed 28 in preparation for engagement with the connector plate 16. If it is desired to disconnect the trailer 14 from the tractor 12 the locking mechanism of the connector plate 16 is first released whereupon the tractor 12 may then be moved out from under the trailer 14 moving the connector plate 16 out of engagement with the pin 26 and thereafter out of engagement with the actuating link 54 which will enable the fifth wheel pin 26 to be recessed within the sleeve 32 by means of gravity whereby the bed 28 of the tractor 12 may then be used to support a pay load.

With attention now directed more particularly to FIGURE 4 of the drawings wherein a modified form of the invention may be seen, it will be noted that the actuating mechanism for moving the fifth wheel pin 26 to an extended operational position comprises a fluid actuator generally designated by the reference numeral 76 which may be operated either by hydraulic or air pressure with the controls (not shown) for the fluid actuator being positioned in the cab 24 of the tractor 12 so that the pin 26 may be extended or retracted at the driver's will.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:
1. In combination with a tractor-trailer combination of the type wherein the tractor is provided with forward and rear wheels and a load bed for accommodating a load and the trailer is provided with rear wheels, a fifth wheel connector plate secured to the front end of said trailer, a recessible fifth wheel pin assembly carried by said tractor releasably engageable with said connector plate, a vertically extending opening formed in said tractor bed, said recessible fifth wheel pin assembly comprising an elongated fifth wheel pin, means slidably mounting said pin for movement through said opening between an inoperative position recessed below the upper surface of said load bed and an operational position with the upper portion of said pin disposed slightly above said upper surface, the upper portion of said pin being releasably engageable with said connector plate, and means carried by said tractor for moving said pin to said operational position, said moving means including an actuating mechanism engageable by said connector plate upon movement of the latter toward said opening along the upper surface of said bed.

2. The combination of claim 1 wherein said mounting means comprises a sleeve fixedly secured in said opening slidably receiving said pin.

3. The combination of claim 2 wherein said sleeve and said fifth wheel pin are cylindrical and said pin is also rotatably received in said sleeve.

4. The combination of claim 1 including a slot formed in said bed rearwardly of said opening, said actuating mechanism comprising an actuating lever, means pivotally securing said actuating lever to the undersurface of said bed, said lever arm extending between said opening and said slot with the portion of said actuating lever disposed forwardly of said securing means comprising a work arm and the portion rearwardly of said securing means comprising a lever arm, the end of said work arm remote from said lever arm being adapted for engagement with the lower end of said pin, an actuating link slidably received in said slot, means pivotally securing the lower end of said actuating link to the end of said lever arm remote from said work arm with the upper end of said actuating link projecting slightly above the upper surface of said bed when said pin is recessed therebelow, the upper end of said actuating link being beveled whereby sliding engagement of said connector plate with the upper end of said actuating link upon movement of said connector plate toward said opening from the rear of said bed will depress said actuating link and raise said pin for engagement with said plate.

5. The combination of claim 4 wherein said work arm is substantially longer than said lever arm.

References Cited in the file of this patent
UNITED STATES PATENTS

| | | |
|---|---|---|
| 1,194,256 | Sutton | Aug. 8, 1916 |
| 1,766,780 | Finch | June 24, 1930 |
| 2,494,799 | Duvall et al. | Jan. 17, 1950 |
| 2,867,450 | Tenenbaum | Jan. 6, 1959 |
| 2,924,464 | Zajac et al. | Feb. 9, 1960 |

FOREIGN PATENTS

| | | |
|---|---|---|
| 358,095 | Germany | Sept. 6, 1922 |